United States Patent

Suzuki

[11] Patent Number: 5,978,657
[45] Date of Patent: Nov. 2, 1999

[54] METHOD OF AND APPARATUS FOR ACQUIRING STRENGTH INFORMATION FROM RECEIVED SIGNALS TRANSMITTED BY A PLURALITY OF BASE STATIONS AND FOR TRANSMITTING A SIGNAL THEREOF

[75] Inventor: Mitsuhiro Suzuki, Chiba, Japan

[73] Assignee: Sony Corporation, Tokyo, Japan

[21] Appl. No.: 08/586,374

[22] Filed: Jan. 17, 1996

[30] Foreign Application Priority Data

Jan. 19, 1995 [JP] Japan ..................................... 7-006723
Mar. 8, 1995 [JP] Japan ..................................... 7-048735

[51] Int. Cl.$^6$ ..................................................... H04Q 7/00
[52] U.S. Cl. .......................... 455/54.2; 455/56.1; 455/63; 455/69
[58] Field of Search .................................. 455/33.1, 34.1, 455/54.1, 54.2, 56.1, 62, 63, 67.1, 67.3, 67.6, 69, 70, 89; 379/59

[56] References Cited

U.S. PATENT DOCUMENTS 5,455,967  10/1995  Amezawa et al. .......................... 455/69
5,539,728  7/1996   Gaiani et al. .............................. 455/69
5,542,097  7/1996   Ward et al. ............................. 455/56.1

*Primary Examiner*—Reinhard J. Eisenzopf
*Assistant Examiner*—Thanh Le
*Attorney, Agent, or Firm*—Jay H. Maioli

[57] ABSTRACT

Power measuring reference signals from a plurality of base stations are transmitted with a predetermined electric power. These reference signals transmitted from the base stations are received by a mobile station. The propagation loss of each base station is detected in response to a reception power of the received reference signal. When the mobile station issues a communication request, the mobile station connects to a communication network between it and a base station with the detected smallest propagation loss. Then, a ratio between the reception power of the reference signal transmitted from the base station connected with the communication network and reception powers of the reference signals transmitted from all other base stations using the same frequency band as that of the base station connected with the communication network is detected and the value of the detected ratio is transmitted to the base station. Then, the base station controls the transmission power of the communication network based on the value of this ratio.

8 Claims, 5 Drawing Sheets

Distribution of CIR

Distribution of Base Station Transmission Power

Distribution of CIR

Distribution of Base Station Transmission Power

Distribution of CIR

Distribution of Base Station Transmission Power

Distribution of CIR

Distribution of Base Station Transmission Power

Distribution of CIR

Distribution of Base Station Transmission Power

Distribution of CIR

Distribution of Base Station Transmission Power

METHOD OF AND APPARATUS FOR ACQUIRING STRENGTH INFORMATION FROM RECEIVED SIGNALS TRANSMITTED BY A PLURALITY OF BASE STATIONS AND FOR TRANSMITTING A SIGNAL THEREOF

BACKGROUND OF THE INVENTION

The present invention relates to a cellular-phone system applicable to a mobile communication system such as a radiotelephone system.

Heretofore, there has been developed a communication system called a cellular-phone system for making radio communication possible between a base station and a mobile station such as mobile telephone or portable telephone.

As shown in FIG. 1, a plurality of base stations BS01, BS02, BS03, . . . are located at a predetermined interval (e.g., at an interval of several kilometers) within a service area. When a mobile station MS existing within the service area communicates with a base station, the mobile station MS receives signals from base stations and judges on the basis of the received signals a most suitable base station (generally, base station located at the nearest position). Then, the mobile station MS supplies a network connection request signal to this base station to set a radio communication network between it and the most suitable base station, thereby making a communication with a called person via the base station connected between it and the communication network.

In the case of the above cellular-phone system, a base station side adjusts a power of a transmission signal in response to a communication state with the mobile station connected to the base station via a communication network. Specifically, the base station side detects a reception level of a signal transmitted from the mobile station. If the detected reception level is high, then the base station lowers the transmission power. If the detected reception level is low, then the base station raises the transmission power. As a consequence, the reception level on the mobile station side can be made relatively constant. Therefore, it can be expected that the communication state can be held constant regardless of the distance between the mobile station and the base station.

In actual practice, however, the reception signal at the mobile station is interfered with by a signal from another base station so that, even when the transmission power is controlled as described above, it is impossible to improve a transmission characteristic considerably. Specifically, if the reception level at the base station, for example, is high, then the transmission power is lowered. In the reception state at the base station, there is then the large possibility that a received signal will be interfered with by some waves on the basis of the state of the transmission line. When the transmission power is lowered, a reception rate of interference wave is increased and a reception state at the mobile station is degraded. There is then the large possibility that a signal from the base station will not be received accurately.

Conversely, if the reception level at the base station is low, then the transmission output is raised. However, if the transmission power of the base station is raised, then such raised transmission power becomes a disturbing wave in the adjacent area of another base station, which the becomes a large interference source for hindering the other base station from making a communication.

FIGS. 2A and 2B are diagrams showing the changes of channel interference ratio (hereinafter simply referred to as CIR) obtained when a transmission power is controlled in the base station. FIG. 2A shows measured results of the change of CIR obtained when the transmission power is not controlled in the base station. FIG. 2B shows measured results of the change of CIR obtained when the transmission power is not changed in response to the reception level.

When the transmission power is not controlled as shown in FIG. 2A, study of transmission power distribution on the right-hand side of FIG. 2A reveals that the transmission power is constant, whereas the channel interference ratio (CIR) is distributed in a wide range. Accordingly, if the transmission power is controlled, there are then many mobile stations which cannot receive a transmission signal due to a large channel interference ratio.

When the transmission power is changed in response to the reception level as shown in FIG. 2B, the transmission power on the right-hand side is largely distributed before and after the reference level and a distribution range of the channel interference ratio (CIR) shown on the left-hand side is narrowed to some extent. Therefore, study of FIG. 2B shows that a reception state could be improved to a certain extent. However, although the transmission power is controlled as described above, the distribution range of the channel interference ratio (CIR) is still large so that there are many mobile stations which cannot receive a transmission signal satisfactorily.

To solve the aforesaid problems, it is proposed to prevent an interference by extending a length in which base stations using the same frequency are located, i.e., enlarging a so-called frequency re-use size. Specifically, when the base stations are located in the state shown in FIG. 1, base stations BS01, BS11, BS21, BS31 and BS41 (base stations shown by open circles in FIG. 1) use the same frequency band (first frequency band) for communication, base stations BS02, BS12, BS22, BS32 and BS42 (base stations shown by open triangles in FIG. 1) use the same frequency band (second frequency band) for communication, and base stations BS03, BS13, BS23, BS33 and BS43 (base stations shown by open squares in FIG. 1) use the same frequency band (third frequency band) for communication, i.e., there are prepared base stations of frequency bands which are used in communications of three kinds in total. In this case, three-frequency band base stations using the first, second and third frequency bands constitute one re-use size R.

When the mobile station MS receives a channel of the first frequency band, there is the large possibility that the mobile station MS will be able to communicate with the nearest base station BS01 most satisfactorily. However, in this case, the mobile station MS receives signals from other base stations BS11, BS21, BS31, BS41 each using the same frequency band for communication. As a result, the signals from these base stations BS11, BS21, BS31, BS41 become interference waves.

In order to lower the level of the interference wave, it is proposed to increase the scale of the re-use size R by increasing the kinds of the frequency bands used and by increasing the number of base stations composing one re-use size R (the number of base stations using different frequency bands). If the re-use size R is increased in scale as described above, then this cellular-phone system uses many more frequencies. As a consequence, the efficiency at which the cellular-phone system uses the frequencies is lowered.

Since the dynamic range of the reception level at the base station reaches several 10s of decibels, if the transmission power from the base station is controlled by the level proportional to such dynamic range, then reception waves with considerably different level ratios exist in the carriers.

There is then the disadvantage that an adjacent channel interference ratio on the reception side is increased.

SUMMARY OF THE INVENTION

In view of the aforesaid aspect, it is an object of the present invention to provide a method and apparatus for controlling power in a cellular-phone system in which a transmission power on a base station can be controlled satisfactorily without increasing channel interference when a mobile station receives a transmission signal.

According to an aspect of the present invention, there is provided a cellular system in which a plurality of base stations are located in a predetermined state and a communication is made between any base station and a mobile station. The cellular system comprises the steps of transmitting power measuring reference signals from the plurality of base stations by a normal electric power, receiving the power measuring reference signals from the base stations by the mobile station, detecting a propagation loss of every base station in response to a received electric power of a received power measuring reference signal, connecting a the base station with minimum detected propagation loss to a communication network when the mobile station issues a communication request signal, obtaining information of a received electric power of the power measuring reference signal transmitted from the base station connected to the mobile station by the communication network and information of received electric powers of power measuring reference signals transmitted from all receivable base stations using the same frequency band as that used by the base station connected with the communication network by the mobile station, transmitting this information to the base station connected to the mobile station by the communication network, and controlling a transmission electric power of the communication network on the basis of the value of this information by the base station which received this information. As this information, there is calculated a ratio of sum of the reception electric power of the electric power measuring reference signal transmitted from the base station connected to the communication network and the reception electric power of the electric power measuring reference signal transmitted from all receivable base stations using the same frequency bands as that of the base station connected via the communication network. The value of this calculated ratio can be used as the above information.

According to another aspect of the present invention, there is provided a cellular system in which a mobile station communicates with any one of a plurality of base stations. The mobile station is comprised of a reception means for receiving power measuring reference signals transmitted from the plurality of base stations using the same frequency band, memory means for obtaining and storing reception level information of respective power measuring reference signals received at the reception means, means for obtaining maximum reception level information and cumulative reception level information generated from other reception level information than the maximum reception level information of reception level information stored in the memory means, means for generating a signal based on the maximum reception level information and the cumulative reception level information, means for transmitting the signal generated by the generating means to a base station having the maximum reception level, and means for opening a communication line between the mobile station and the base station having the maximum reception level for making a call when the mobile station and a base station have a communication request, wherein the mobile station can reduce interference of received signals and receive a signal from the base station each time the base station controls a transmission power of signal based on the maximum reception level information and the cumulative reception level to the mobile station.

DETAILED DESCRIPTION OF THE PREFERRED EMBODIMENT

The present invention will now be described below with reference to FIG. 3 through FIGS. 5A to 5D.

Figure 1:
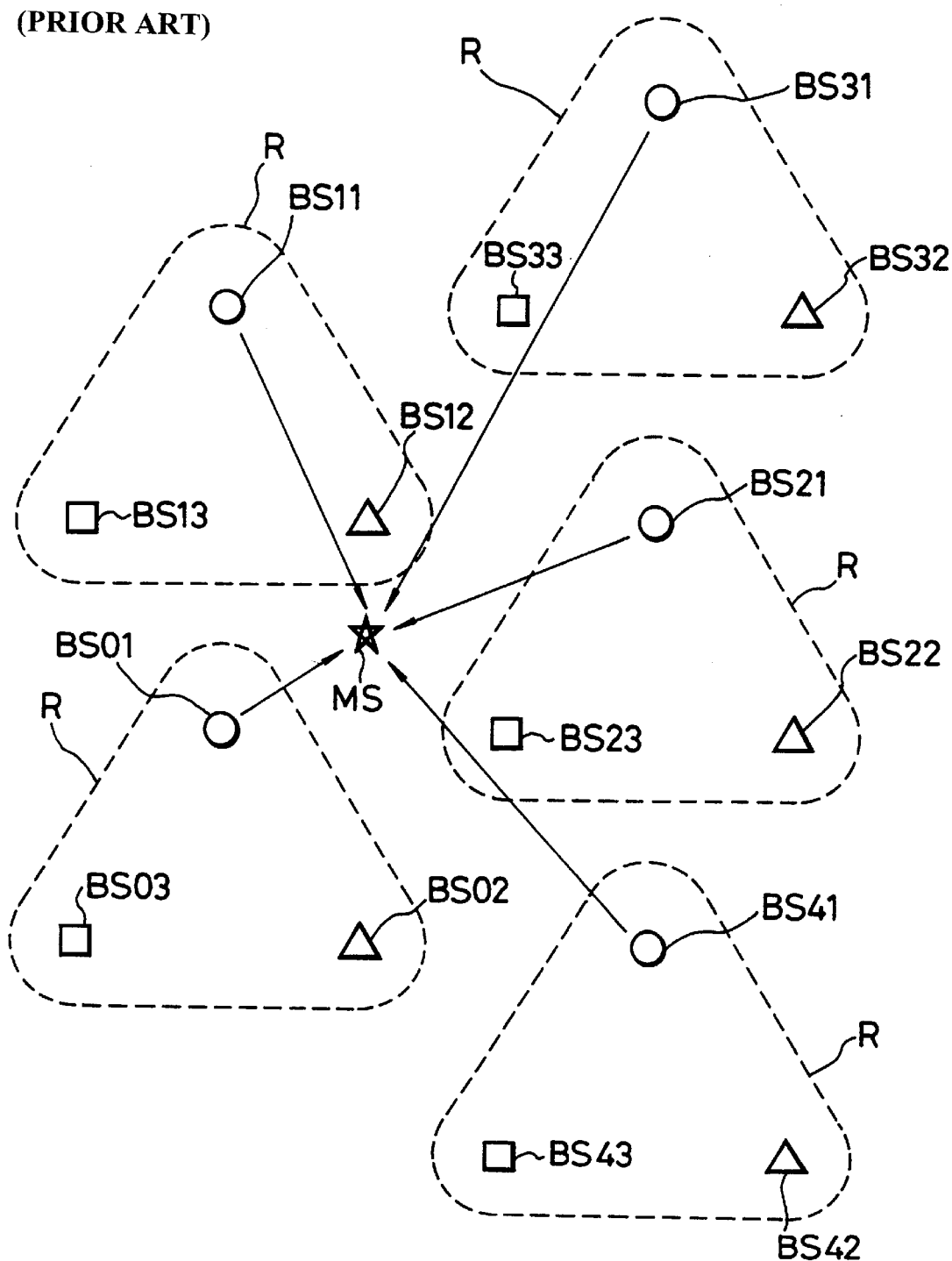
FIG. 1 is a schematic diagram showing a manner in which channel interference occurred in a cellular-phone system.

In this embodiment, the present invention is applied to a radiocommunication cellular-phone system in which a plurality of base stations each with a predetermined interval communicate with a mobile station. The base stations are located in a manner mentioned before with reference to FIG. 1. Specifically, the three kinds of frequency bands, i.e., first, second and third frequency bands are prepared, and the base stations using the channel of the first frequency band, the base stations using the channel of the second frequency band and the base stations using the channel of the third frequency band constitute one re-use size R. However, allocations of used frequency bands are given only on the used frequencies of the communication network and frequencies are not always similarly allocated to frequencies at which control signals are transmitted.

Each base station sets a communication network between it and a mobile station by a predetermined channel (frequency) in the prepared frequency bands to make communication between it and the mobile station possible by radio waves. In this case, each base station constantly transmits a power measuring reference signal by use of a previously-determined channel such as a control channel (a constant transmission of power measuring reference signal includes the case where an intermittent transmission of power measuring reference signal is carried out periodically). The transmission power (transmission output) of the power measuring reference signal is made the same in all base stations.

The power measuring reference signal transmitted from each base station is transmitted in such a state that each mobile station can identify which base station has transmitted the power measuring reference signal, in such a way as to change a transmission channel at every base station. Alternatively, when the power measuring reference signal is transmitted with the same frequency by each base station, the transmission timing is changed at every base station or the power measuring reference signal contains an identification signal so that each base station can identify the power measuring reference signal. Further, this power measuring reference signal is not always especially prepared and another control signal transmitted from the base station may be used as the power measuring reference signal.

Each base station adjusts the transmission output (transmission power) of a transmission signal transmitted from the base station to the mobile station based on data transmitted from each mobile station when each base station sets a communication network between it and each mobile station. A specific adjustment processing therefor will be described later on.

A mobile station of a communication system according to the present invention will be described with reference to FIG. 3.

Figure 3:
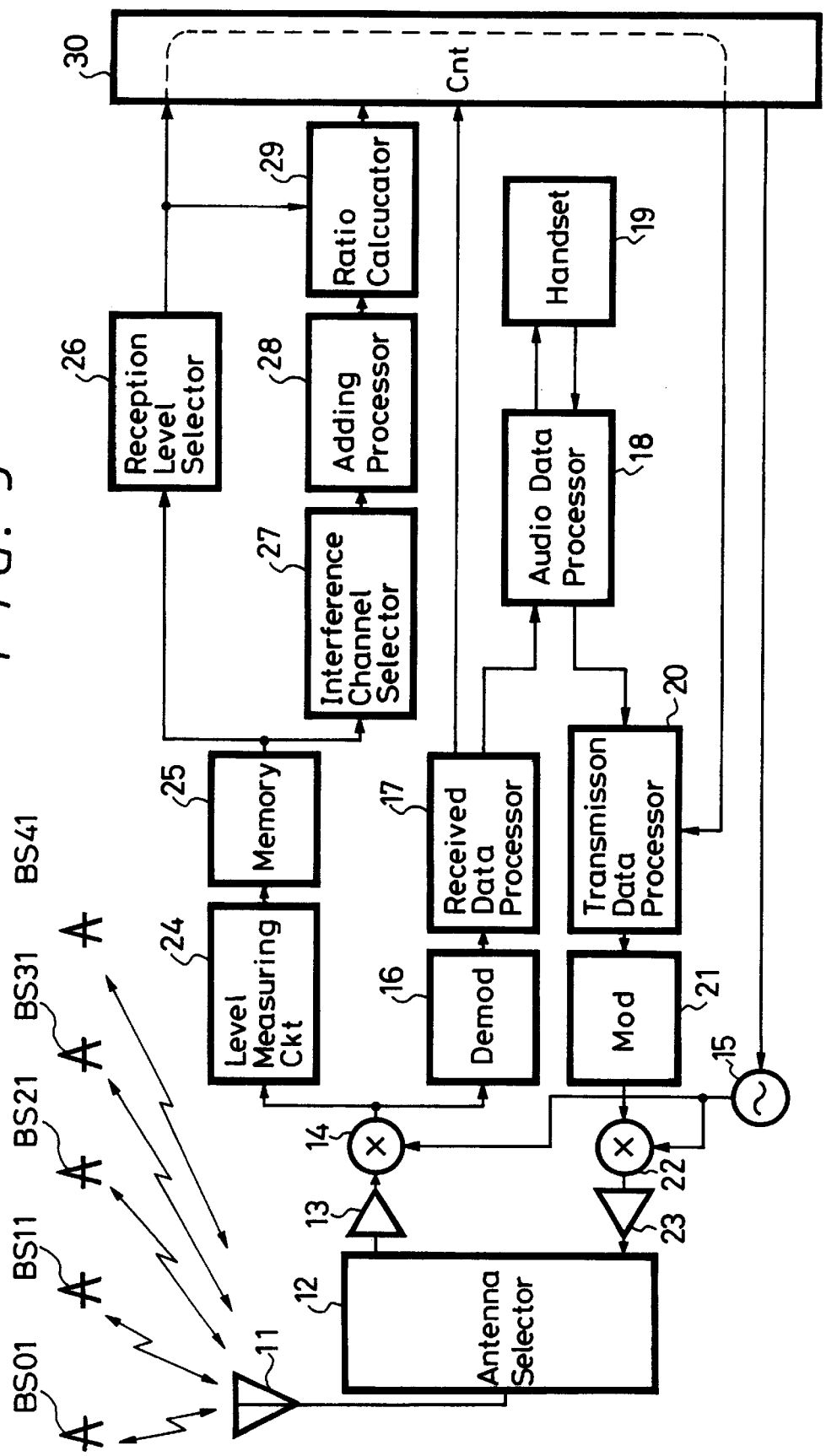
FIG. 3 shows in block form a mobile station according to an embodiment of the present invention.

As shown in FIG. 3, a mobile station includes an antenna 11 for receiving a signal from a base station. A signal received at the antenna 11 is supplied through an antenna selector 12 and a reception amplifier 13 to a frequency mixer 14. The frequency mixer 14 mixes a transmission reception channel selecting frequency signal supplied thereto from a frequency oscillator 15 to the received signal to thereby convert a signal of a predetermined transmission channel (frequency) into an intermediate frequency signal of a predetermined frequency. In this case, an oscillation frequency from the frequency oscillator 15 is set under control of a controller 30 which controls a communication operation of this mobile station.

The intermediate signal from the frequency mixer 14 is supplied to a demodulator 16 and thereby demodulated in a manner based on a modulation system applied to this communication system to provide a demodulated signal. The demodulated signal is supplied to a received data processor 17. The received data processor 17 extracts necessary data such as audio data from the demodulated signal. Audio data thus extracted is supplied to an audio data processor 18, in which it is converted to an analog audio signal. The analog audio signal from the audio data processor 18 is supplied to a handset 19, in which it is emanated from a speaker (not shown) as voices.

Control data extracted from the received data by the received data processor 17 (i.e., control data transmitted from the base station side) is supplied to the controller 30.

An audio signal from a microphone (not shown) disposed within the handset 19 is supplied to the audio data processor 18, in which it is converted to digital audio data with a predetermined format. Thus converted audio data is supplied to a transmission data processor 20. The transmission data processor 20 processes data into transmission format. In this case, control data transmitted from the controller 30 is also supplied to the transmission data processor 20 and the control data is transmitted to the base station side together with audio data.

In this embodiment, data indicative of a reception state at the mobile station is transmitted as the control data which is transmitted together with this audio data. The reception state data will be described in detail later on.

The transmission data made by the transmission data processor 20 is supplied to a modulator 21, in which it is modulated in a manner based on a modulation system applied to this communication system to provide a modulated signal. A thus modulated transmission signal is supplied to a frequency mixer 22. The frequency mixer 22 mixes a transmission reception channel selection frequency signal output from the frequency oscillator 15 to the transmission signal to provide a transmission signal of a predetermined channel (frequency). This transmission signal is supplied through a transmission amplifier 23 and the antenna selector 12 to the antenna 11 from which it is transmitted by radio waves.

In this case, the transmission channel and the reception channel which are determined depending on the frequency signal output from the frequency oscillator 15 are either the same frequency or different frequencies.

The intermediate frequency signal converted by the frequency mixer 14 is supplied to a level measuring circuit 24. The level measuring circuit 24 is adapted to measure the signal level (i.e., reception level) of the intermediate frequency signal. Data indicative of measured (detected) reception level is supplied to and stored in a memory 25. The level measuring circuit 24 measures the signal level and the measured data is stored in the memory 25 under control of a controller 30. In this embodiment, data indicative of the reception level at which a power measuring reference signal (or other signal used as a power measuring reference signal) transmitted from the base station is stored in the memory 25 under control of the controller 30. In this case, data indicative of the reception level is stored in the memory 25 in such a manner as to indicate which base station transmitted the signal. For example, an identification code (ID code) of the base station contained in the control data is judged and data indicative of the reception level is stored in the corresponding area. The data indicative of reception level is stored in the memory 25 for all power measuring reference signals transmitted from all base stations that the mobile stations can receive at their current positions.

Data stored in the memory 25 is read out and supplied to a maximum-channel selector 26 and an interference station selector 27. The maximum-channel selector 26 is adapted to select a base station of which the reception level is maximum. The interference-channel selector 27 is adapted to specify other base stations that the base station of which the reception level is maximum.

The maximum-channel selector 26 judges and selects a base station which transmits data indicative of the maximum reception level from the data of reception level stored in the memory 25 i.e., judges and selects a base station with a minimum propagation loss. Then, the maximum-channel selector 26 supplies data indicative of a selected base station to the controller 30 and also supplies data of the reception level of that base station to the controller 30 and a ratio calculator 29.

The interference-channel selector 27 reads data indicative of reception levels of the all base stations (not including the base station selected by the maximum-channel selector 26) using the same frequency band as that of the base station selected by the maximum-channel selector 26 from the memory 25. The interference-channel selector 27 supplies the reception level data thus read to an adding processor 28 which adds all reception level data read out from the memory 25. Added data from the adding processor 28 is supplied to the ratio calculator 29.

The ratio calculator 29 calculates a ratio between the reception level added by the adding processor 28 and the reception level of the station selected by the maximum-channel selector 26. A calculated ratio will hereinafter be referred to as a reference channel interference ratio $CIR_{ref}$. Data of the calculated reference interference channel ratio $CIR_{ref}$ is supplied to the controller 30.

The controller 30 transmits a line connection request signal to the base station selected by the maximum-channel selector 26 (i.e., base station whose power measuring reference signal reception level is highest) when this mobile station requests line-connection to the base station side. In this case, the line-connection request signal is added with information indicative of the added reception level of the adding processor 28 and the reception level of the base station selected by the maximum-channel selector 26, e.g., data indicative of the reference channel interference ratio $CIR_{ref}$ calculated by the ratio calculator 29 and then transmitted. Moreover, when this mobile station is called by a certain call signal transmitted from the base station side and this mobile station answers the call, an answer signal is added with data indicative of the reference channel interference ratio $CIR_{ref}$ and then transmitted to the base station.

A communication line of a predetermined channel is set between the base station and a mobile station with the line-connection request signal transmitted thereto or a mobile station with a call answer signal transmitted thereto under control of the base station side. Communication data is transmitted and received between the base station and the mobile station via this line and voice data for making a call is transmitted. When communication data is transmitted from the base station via the communication line, a transmission output (transmission power) is set on the basis of data indicative of the reference channel interference ratio $CIR_{ref}$ transmitted from the mobile station side. At that time, the transmission power is set to a value proportional to $-\beta$ square (i.e., inverse-proportional to $\beta$ square) of the value of the reference channel interference ratio $CIR_{ref}$ ($\beta$ is a constant which can satisfy $1 \geq \beta > 0$). Alternatively, if the above calculated set value is lower than a lower limit value, then a control value may be set to the lower limit value and the transmission power may be set.

A manner in which the base station in the communication system according to the present invention sets a transmission power will be described below.

Initially, the reference channel interference ratio $CIR_{ref}$ calculated on the mobile station side will be described. Let it now be assumed that the mobile station MS calculates the reference channel interference ratio $CIR_{ref}$ existing within the service area wherein the base stations are located in the state shown in FIG. 1. Then, the maximum-channel selector 26 determines that the reception level of the power measuring reference signal transmitted from the base station BS01 for making a communication by the channel of the first frequency band is highest. At that time, the interference-channel selector 27 judges reception levels of electric power measuring reference signals from all remaining base stations BS11, SB21, BS31, BS41 capable of making a communication by the same frequency band. Then, the adding processor 28 adds the reception levels and calculates an electric power sum of a sum of reception levels of signals which become disturbing waves as in the following equation (1):

$$I = \Sigma Ri \quad (1)$$

where i is the other stations using the same frequency.

Then, a ratio between the electric power sum I of the reception levels and a value of a reception level $R_{01}$ of the base station BS01 is calculated by the following equation (2). A calculated result is the reference channel interference ratio $CIR_{ref}$:

$$CIR_{ref} = R_{01}/I \quad (2)$$

In this case, the base station to which the mobile station MS is connected via the communication line is the base station BS01. If the data indicative of the reference channel interference ratio $CIR_{ref}$ is transmitted to the base station BS01, then the mobile station MS is controlled so as to transmit a signal to the base station BS01 by an electric power P expressed by the following equation (3) or (4):

$$P = P_0 (CIR_{ref})^{-\beta} \quad (3)$$

$$P = \begin{cases} P_0(CIR_{ref})^{-\beta} & (P_0(CIR_{ref})^{-\beta} > P_L) \\ P_L & (P_0(CIR_{ref})^{-\beta} \leq P_L) \end{cases} \quad (4)$$

In the above equations (3) and (4), $P_0$ is the reference transmission electric power for each base station. The reference transmission electric power is the same value in each base station. $\beta$ is a constant which can satisfy $1 \geq \beta < 0$. In order to remove the channel interference completely, the constant $\beta$ should preferably be set to 1 from an ideal standpoint. However, if the constant $\beta$ is set to 1, then the variable range of transmission power is widened considerably. Therefore, in actual practice, the constant $\beta$ is set to about 0.5. Alternatively, the variable range of the transmission power may be limited when the lower limit value is set.

Substituting the above equation (3) by logarithm yields the following equation (5):

$$\log P = \log P_0 - \beta \cdot \log(CIR_{ref}) \quad (5)$$

Figure 4:
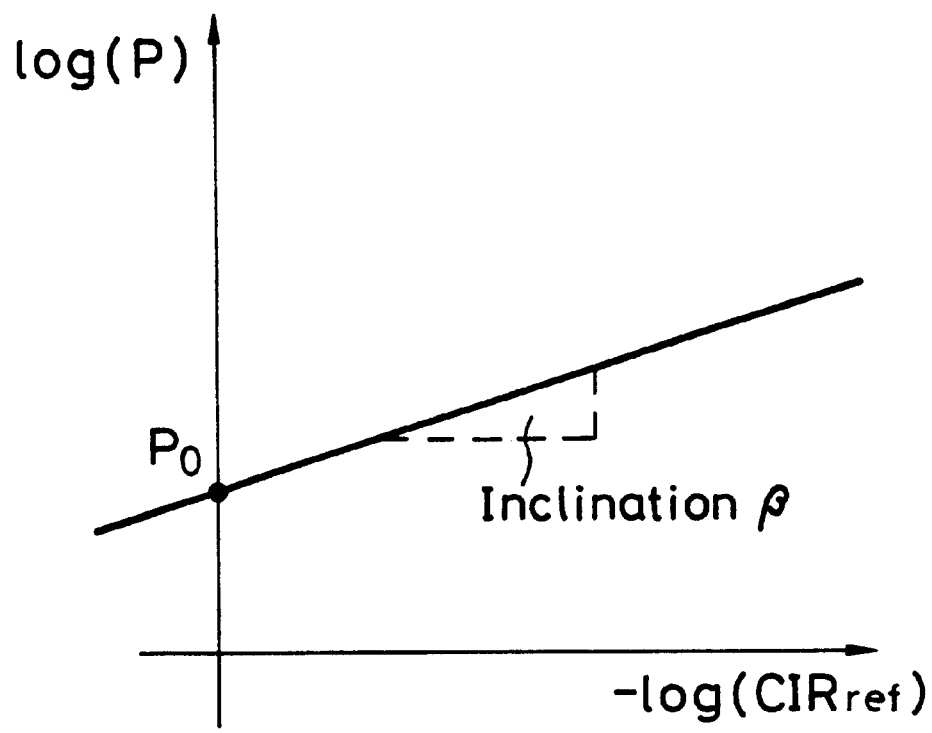
FIG. 4 is a characteristic graph showing control characteristics according to the present invention.

A control characteristic becomes a straight line shown in FIG. 4 and an inclination of straight line becomes $\beta$.

When the transmission power of the base station is controlled as described above, interference based on a transmission signal from another base station of the signal received by each mobile station can be suppressed to a satisfactory range.

Figure 2A:
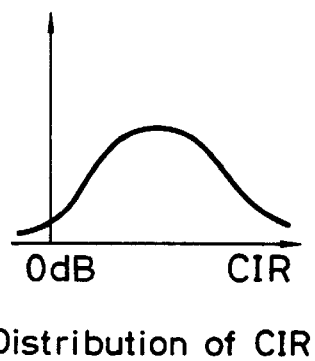
FIGS. 2A and 2B are diagrams showing measured results of channel interference ratios and transmission power of base stations, respectively.
Figure 2A:
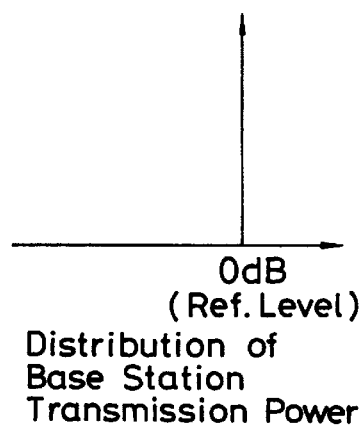
Figure 2B:
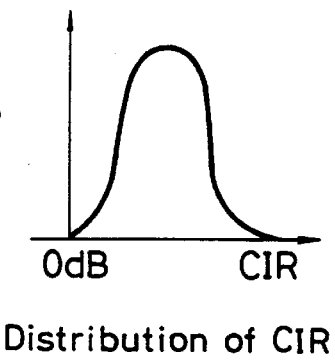
Figure 2B:
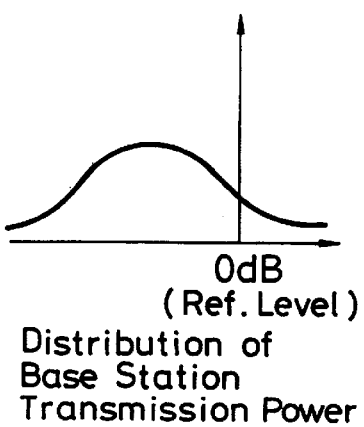
Figure 5A:
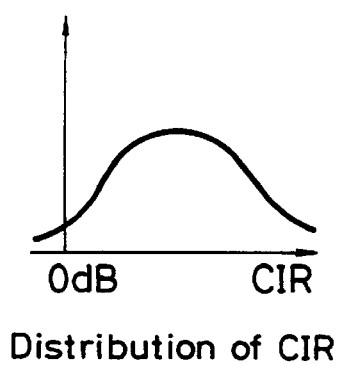
FIGS. 5A through 5D are diagrams showing measured results of channel interference ratios and transmission power of base stations according to the present invention, respectively.
Figure 5A:
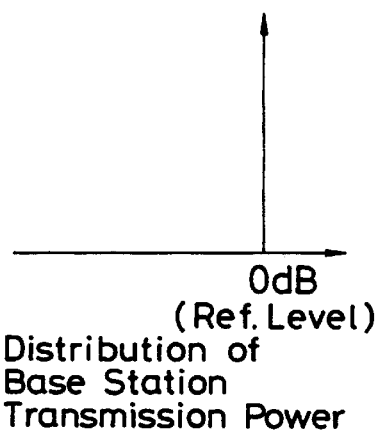
Figure 5B:
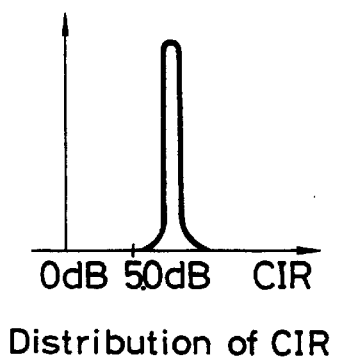
Figure 5B:
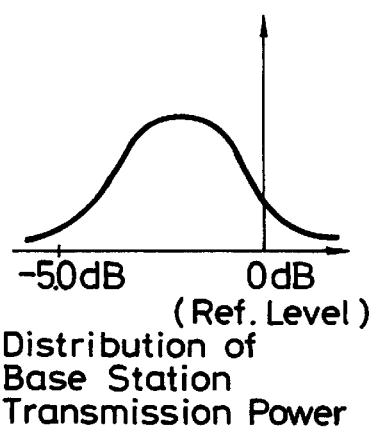
Figure 5C:
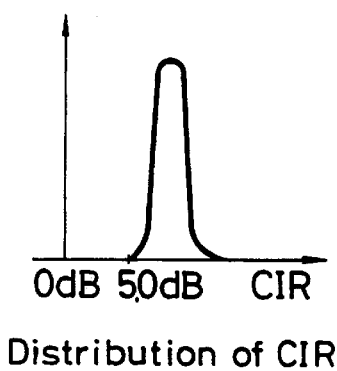
Figure 5C:
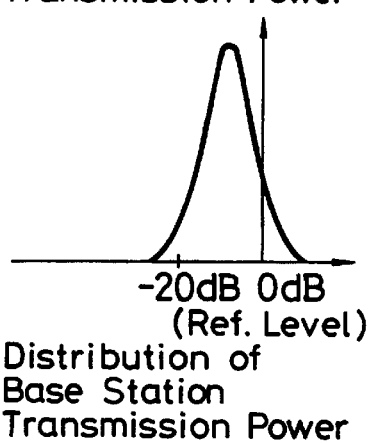
Figure 5D:
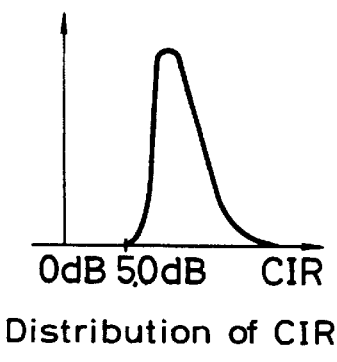
Figure 5D:
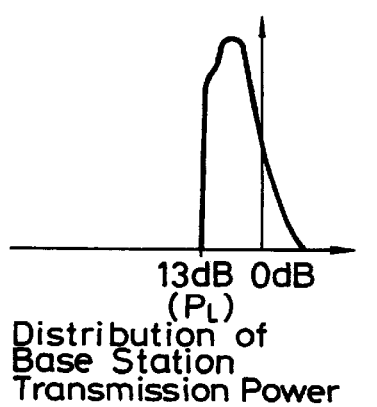

Specifically, FIGS. 5A through 5D show measured results of the channel interference ratio (shown by CIR) changed when a transmission power is controlled according to the present invention. FIG. 5A shows measured results of the channel interference ratio changed when the transmission power is not controlled (the same as shown in FIG. 2A). FIG. 5B shows measured results of the channel interference ratio changed when the transmission power is controlled under the condition that the constant $\beta$ in the equation (3) is set to 1.0. FIG. 5C shows measured results of channel interference ratio changed when the transmission power is controlled under the condition that the constant $\beta$ in the equation (3) is set to 0.5. FIG. 5D shows measured results of the channel interference ratio changed when the transmission power is controlled under the condition that the constant $\beta$ in the equation (4) is set to 1.0 and that $P_L$ in the equation (4) is set to $P_L = 0.05 P_0$.

When the transmission power is not controlled as shown in FIG. 5A, study of transmission power distribution shown on the right-hand side of FIG. 5A reveals that a transmission power is constant. Also, the channel interference ratio (CIR) shown on the left-hand side of FIG. 5A is distributed in a wide range. Therefore, when the transmission power is not controlled, the channel interference ratio is large so that there are many mobile stations which are unable to receive a transmission signal satisfactorily like the prior art.

When the transmission power is controlled according to the present invention, e.g., under the condition that the constant $\beta$ is set to 1.0, as shown in FIG. 5B, although the transmission power shown on the right-hand side of FIG. 5B is largely distributed before and after the reference level, a distribution range of channel interference ratio (CIR) shown on the right-hand side of FIG. 5B is concentrated in a very narrow range with the result that the reception state at the mobile station becomes substantially constant (i.e., substantially constant channel interference ratio).

When the transmission power is controlled under the condition that the constant $\beta$ is set to 0.5, as shown in FIG. 5C, although the transmission power distribution range shown on the right-hand side of FIG. 5C is reduced to approximately half that as compared with the transmission power distribution range obtained under the condition that the constant β is set to 1.0, a distribution range of channel interference ratio (CIR) shown on the left-hand side of FIG. 5C is a little wider than that obtained under the condition that the constant β is set to 1.0 but is still concentrated in a very narrow range. As a result, the reception state at the mobile station becomes substantially constant (i.e., substantially constant channel interference ratio). Therefore, considering the control range of the transmission output (i.e., load of the transmission output adjustment circuit on the base station side) and obtained characteristics, it should be most preferable to set the constant β to about 0.5.

Further, when the equation (4) is used, the distribution range of channel interference ratio (CIR) is not distributed on a portion where the CIR is not satisfactory. A satisfactory channel interference ratio (CIR) can be assured in all mobile stations. At the same time, the control range of the transmission power can be suppressed to a the narrow range.

According to the communication system of this embodiment, a distribution range of the channel interference ratio (CIR) obtained when each mobile station receives signals can be suppressed to a very small range and therefore signals can be received in substantially the same state with less channel interference. Accordingly, as compared with the case that the base station controls a transmission power in response to the reception level at the base station, the reception state of the mobile station can be improved considerably. Specifically, it is possible to prevent a quality of communication from being made irregular when a distance between the base station and the mobile station is changed. Further, since the channel interference can be reduced, when the cellular-phone system is arranged, the spacing with which the base stations using the same frequency band are located can be reduced comparatively. Moreover, the re-use size required when the base stations are located can be made small and the efficiency at which the frequency is used can be improved. Further, since signals need not be transmitted by a transmission power larger than is necessary, a control range of transmission output can be suppressed to a minimum range. There is then the small possibility that the reception signal will be disturbed by a difference of transmission levels at adjacent channels. Therefore, when a reception circuit in a mobile station is arranged, signals can be received satisfactorily without improving a disturbance eliminating ability of a circuit which can eliminate interference caused in the adjacent channels. As a result, a load on the reception circuit can be reduced and therefore the circuit arrangement can be simplified.

While the reference channel interference ratio data is transmitted from the mobile station to the base station when the communication network is set as described above, the present invention is not limited thereto and the following variant is also possible. That is, the reference channel interference ratio data serving as accompanying data may be transmitted successively and the transmission power from the base station may be changed successively during the communication. With this arrangement, when the mobile station, for example, is mounted on a navigation vehicle such as an automobile and the position of the mobile station is being changed during the communication, the change of the transmission output can follow in real time the interference state changed during the communication.

While specific modulation system and channel arrangement have not been described so far, the specific feature of the present invention does not lie in these points. It is to be noted that the present invention can be applied to any cellular-phone systems so long as the communication system is of a type of cellular-phone system with a plurality of base stations.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A method of communication between one of a plurality of base stations and a mobile station, for a cellular system having said plurality of base stations located in a predetermined arrangement, comprising the steps of:

transmitting power measuring reference signals from said plurality of base stations by a normal power strength;

receiving said power measuring reference signals from said base stations by said mobile station;

detecting a propagation loss of each of said plurality of base stations in response to a received power strength of said received power measuring reference signal;

connecting said mobile station to a base station with minimum detected propagation loss by a communication channel when said mobile station issues a communication request signal;

detecting a ratio between said received power strength of said power measuring reference signal transmitted from said base station connected to said mobile station by said communication channel and a sum of received power strength of said power measuring reference signals transmitted from all receivable one of said plurality of base stations using the same frequency band as that used for said communication channel;

transmitting a value of the detected ratio to said base station connected to said mobile station by said communication channel; and controlling a transmission power strength of said communication channel on the basis of the value of said ratio by said base station which received the value of said ratio.

2. The method according to claim 1, wherein said transmission power strength is set to a value proportional to $-\beta$ square of the value of said ratio transmitted for said mobile station where $\beta$ is a constant ranging from $1 \geq \beta > 0$.

3. The method according to claim 2, wherein said constant β is about 0.5.

4. The method according to claim 1, wherein said transmission power strength has a lower limit value and said lower limit value is used as said transmission power strength when said transmission power strength is lower than said lower limit value.

5. A method of communication between a mobile station and any of a plurality of base stations in a cellular system, comprising the steps of:

receiving a plurality of power measuring reference transmitted from said plurality of base stations by use of a same frequency band;

obtaining a plurality of reception level information of said plurality of received power measuring reference signals;

obtaining a maximum reception level information from each of said plurality of obtained reception level information and a cumulative reception level information generated from accumulated reception level information other than said maximum reception level information;

transmitting a signal based on said maximum reception level information and said cumulative reception level information to a base station having said maximum reception level; and opening a communication network between said mobile station and said base station having said maximum reception level when said mobile station and a base station have a communication request, wherein said mobile station can reduce interference of received signals and receive a signal from said base station each time said base station controls a transmission power of signal based on said maximum reception level information and said cumulative reception level information to said mobile station.

6. The method according to claim 5, further comprising a step of calculating a ratio between said maximum reception level information and said cumulative reception level information.

7. A mobile station in a cellular system in which said mobile station communicates with any one of a plurality of base stations, said mobile station in said cellular system comprising:

reception means for receiving a plurality of power measuring reference signals transmitted from said plurality of base stations using a same frequency band;

memory means for obtaining and storing a plurality of reception level information of said plurality of respective power measuring reference signals received at said reception means;

means for obtaining a maximum reception level information and a cumulative reception level information generated from a portion of said reception level information stored in said memory means;

means for generating a signal based on said maximum reception level information and said cumulative reception level information;

means for transmitting said signal generated by said generating means to a base station having said maximum reception level; and means for opening a communication channel between said mobile station and said base station having said maximum reception level for making a call when said mobile station and a base station have a communication request, wherein said mobile station reduces interference of a plurality of received signals and receives a signal from said base station each time said base station controls a transmission power of said signal to said mobile station based on said maximum reception level information and said cumulative reception level.

8. The method according to claim 7, further comprising means for calculating a ration between said maximum reception level information and said cumulative reception level information from signals based on said maximum reception level information and said cumulative reception level information and wherein ratio information is transmitted to a base station.

* * * * *